US008926196B2

(12) United States Patent
Detofsky et al.

(10) Patent No.: US 8,926,196 B2
(45) Date of Patent: Jan. 6, 2015

(54) METHOD AND APPARATUS FOR AN OPTICAL INTERCONNECT SYSTEM

(71) Applicant: Intel Corporation, Santa Clara, CA (US)

(72) Inventors: Abram M. Detofsky, Tigard, OR (US); Chukwunenye S. Nnebe, Folson, CA (US); Jin Yang, Hillsboro, OR (US); Tak M. Mak, Union City, CA (US); Sasha N. Oster, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 13/631,619

(22) Filed: Sep. 28, 2012

(65) Prior Publication Data

US 2014/0093214 A1 Apr. 3, 2014

(51) Int. Cl.
 *G02B 6/36* (2006.01)
(52) U.S. Cl.
 USPC ............... 385/93; 385/88; 385/89; 385/90; 385/92

(58) Field of Classification Search
 USPC .......................................... 385/93
 See application file for complete search history.

(56) References Cited

U.S. PATENT DOCUMENTS

| 6,290,401 B1 * | 9/2001 | Tian ................... 385/88 |
| 8,044,673 B1 * | 10/2011 | Burgyan .............. 324/750.16 |
| 2013/0027863 A1 * | 1/2013 | Tsai et al. ............ 361/679.4 |

* cited by examiner

*Primary Examiner* — Ryan Lepisto
(74) *Attorney, Agent, or Firm* — Konrad Raynes Davda & Victor LLP; Rabindranath Dutta (57) ABSTRACT

Provided are a method and a system, in which a first device aligns a chip to a socket along a first axis. A second device aligns the chip to the socket along a second axis, and a third device aligns the chip to the socket along a plane formed by the first axis and a third axis. Also provided is a system comprising a first optical element, and a second optical element, where a first elastic element is coupled to the first optical element, and a second elastic element is coupled to the second optical element, and where the first elastic element is aligned to the second elastic element via elastic coupling.

17 Claims, 10 Drawing Sheets

METHOD AND APPARATUS FOR AN OPTICAL INTERCONNECT SYSTEM

BACKGROUND

A photonic integrated circuit or integrated optical circuit is a device that may integrate a plurality of optical components that allow information signals to be received, transmitted or processed, where the information signals are carried over optical wavelengths. In addition to optical components, integrated optical circuits may also include electrical components that receive, transmit, and process electrical signals. The integrated optical circuits may communicate via optical cables, and such types of communications and connections may be referred to as optical interconnect. Systems that implement optical interconnect may be referred to as optical interconnect systems.

A socket is device that allows easy insertion and placement of chips comprising integrated circuits, on a printed circuit board. A socket may comprise a physical connector that accepts the chip. Sockets are an integral part of high-volume manufacturing (HVM) test methodology for semiconductor components, and may be used to validate functional and static reliability of the electrical and mechanical interfaces between a device under test (DUT) and a test interface unit (TIU). The DUT is comprised of the chip (i.e., an integrated circuit) including optical and electrical elements on the chip.

The usage of optical interconnect systems and applications has been increasing over time, in order to address the bandwidth limitations of copper-based high-speed electrical systems. As a result there is the need to define a suitable HVM test methodology with a suitable optical socket. The electrical and mechanical requirements of an optical socket may need to be designed to support electrical and optically-modulated data rates that may extend beyond 25 gigabits per second channel. In addition, the alignment schemes of the DUT to the optical socket may need to ensure that the optical coupling reduces optical reflections caused by refraction index changes between a light source and the coupling lens system. The optical socket may need proper thermal dissipation with an effective clamp design to contact the DUT and minimize adverse thermal effects from influencing the peak optical power and jitter components measured from the DUT during HVM testing.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments implement an optical socket assembly that provides reliable interfaces for both electrical and optical connections into an optical chip from an integrated socket. Certain embodiments provide mechanisms for proper mechanical loading of the optical chip such that all electrical connections are engaged while at the same time alignments are achieved for optical interfaces. The coupling of the electrical/optical connectors to the socket may be along the top surface of the socket as well as from one or more of the side surfaces of the socket. It may be noted that in certain embodiments optical interfaces may need to be aligned to tolerances of 10 micron or less, unlike electrical interfaces in which the tolerances for alignment may be more relaxed in comparison to optical interfaces. The embodiments may be implemented for both optical interfaces as well as for electrical interfaces.

Certain embodiments provide an optical socket apparatus that may be used in an automated "pick-and-place" HVM environment to support optical module testing. In certain embodiments, the apparatus is a compact, passive-alignment socket that allows a DUT optical lens assembly to be mated to a fiber jumper assembly by a direct current (DC) motor that is engaged and actuated for full contact. The optical socket apparatus may be comprised of a socket cavity, a socketing clamp, a DC motor, and an optical lens jumper assembly to provide efficient socketing and clamping of the DUT.

Figure 1:
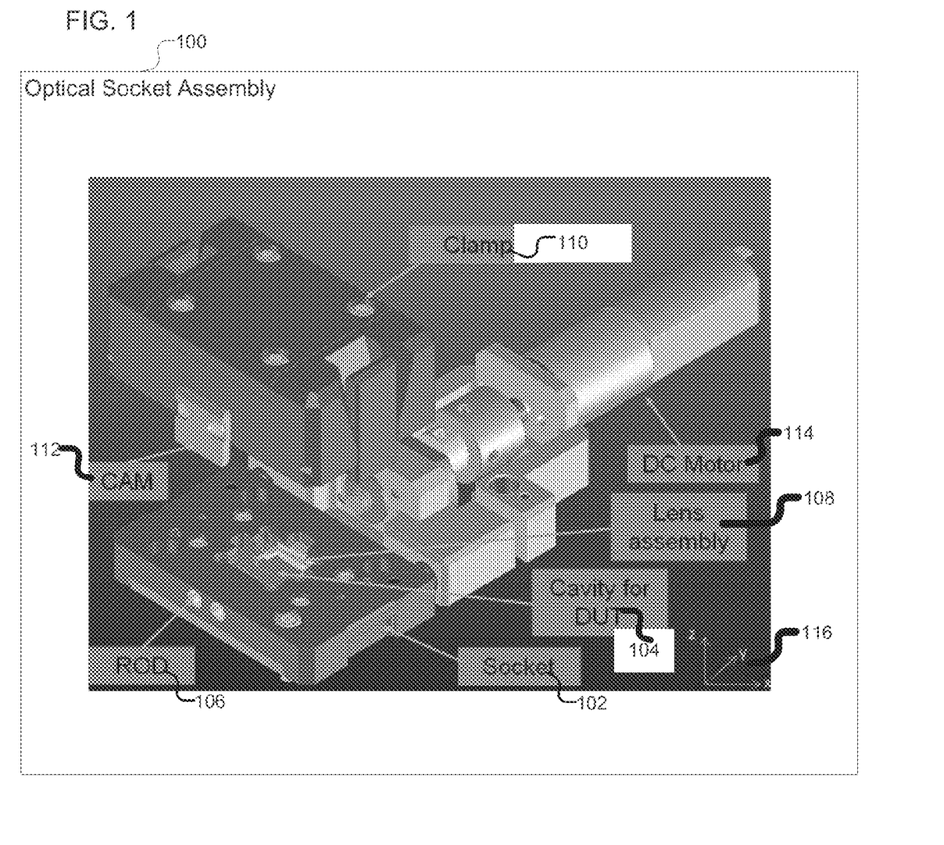
FIG. 1 illustrates a block diagram of an exemplary optical socket assembly, in accordance with certain embodiments.

FIG. 1 illustrates a block diagram of an exemplary optical socket assembly 100, in accordance with certain embodiments. The exemplary optical socket assembly 100 is comprised of a socket 102 that includes at least a socket cavity 104 for the DUT, one or more rods 106, and a lens assembly 108. The DUT is lowered into the socket cavity 104 and aligned such that optical elements on the DUT are coupled to corresponding elements of the lens assembly 108 for achieving optical communications.

The exemplary optical socket assembly 100 also comprises a clamp 110, a CAM 112, and a DC motor 114. The clamp 110 may compress the DUT into the socket cavity 104 and align the DUT along a vertical axis. The CAM 112 in coordination with the rods 106 and other elements may further align the DUT along a lateral axis.

The exemplary optical socket assembly 100 may be represented in a three-dimensional coordinate system via the X, Y, and Z axis as shown via reference numeral 116. In certain embodiments the Z axis is the vertical dimension that is perpendicular to the XY plane, and the compression of the DUT into the cavity 104 via the clamp 110 may be achieved primarily via the movement of the DUT along the Z axis. In certain embodiments, the socket 102 may include one or more chamfers to guide accurate DUT placement within the socket cavity 104.

In certain embodiments, the DUT is lowered into the socket 104. The clamp 110 is mechanically moved along the vertical axis (Z-axis) and the clamp 110 compresses the DUT into the socket 102 such that electrical contacts are aligned. For connectors on the DUT and/or socket 102 that align along the vertical direction the alignment may be primarily achieved via the compression of the DUT into the socket 102 via the clamp 110. However, in certain embodiments optical or electrical contacts may also be present on the lateral (i.e., side) surface(s) of the DUT or socket 102. Certain embodiments align the optical or electrical contacts that are present on the side surfaces, and both vertical and lateral alignment of such contacts that may be present on the side surfaces are achieved.

The DUT is constrained correctly in the three dimensional space such that both vertical and lateral electrical/optical contacts on the DUT and socket 102 are properly aligned. The mechanical references of the DUT are pressed up against the mechanical references of the socket body. The DUT makes a hard stop on a known machine reference plane which constrains the alignment along the Z axis (vertical axis). The alignment along the other axes is achieved via additional mechanisms described below.

Figure 2:
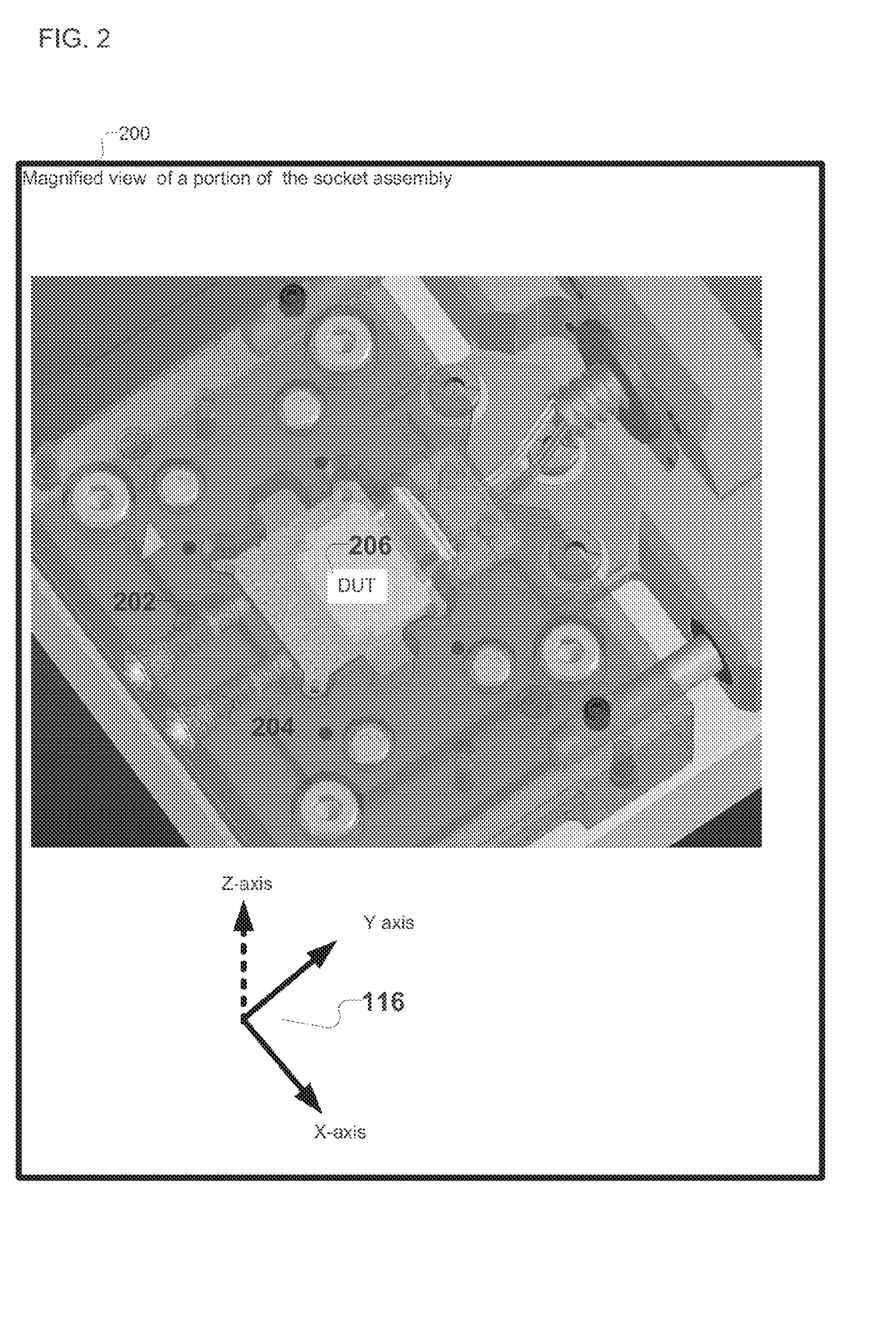
FIG. 2 illustrates a block diagram that shows a magnified view of a portion of the optical socket assembly of FIG. 1, in accordance with certain embodiments.

FIG. 2 illustrates a block diagram 200 that shows a magnified view of a portion of the socket assembly 100 of FIG. 1, in accordance with certain embodiments. The X, Y, and Z-axis are shown via reference numeral 116, where the Z-axis is perpendicular to the XY plane and is shown via dotted lines as coming out the two dimensional surface of the paper on which FIG. 2 is drawn.

The exemplary DUT 206 makes a hard stop on the socket floating plate in the Z-axis dimension, and the floating plate rests on 4 non-conductive spring-loaded pins placed at equal distance from the edges of the DUT package. The rough alignment between the lens assembly 108 and optical jumpers in the vertical Z-axis is achieved based on the hard stop.

Rod and spring mechanisms 202, 204 that comprise a socketing clamp mechanism are shown in FIG. 2. The rod and spring mechanisms 202, 204 are used in combination with the CAM 112 (shown in FIG. 1) for alignment of the DUT 206 along the Y-axis.

Figure 3:
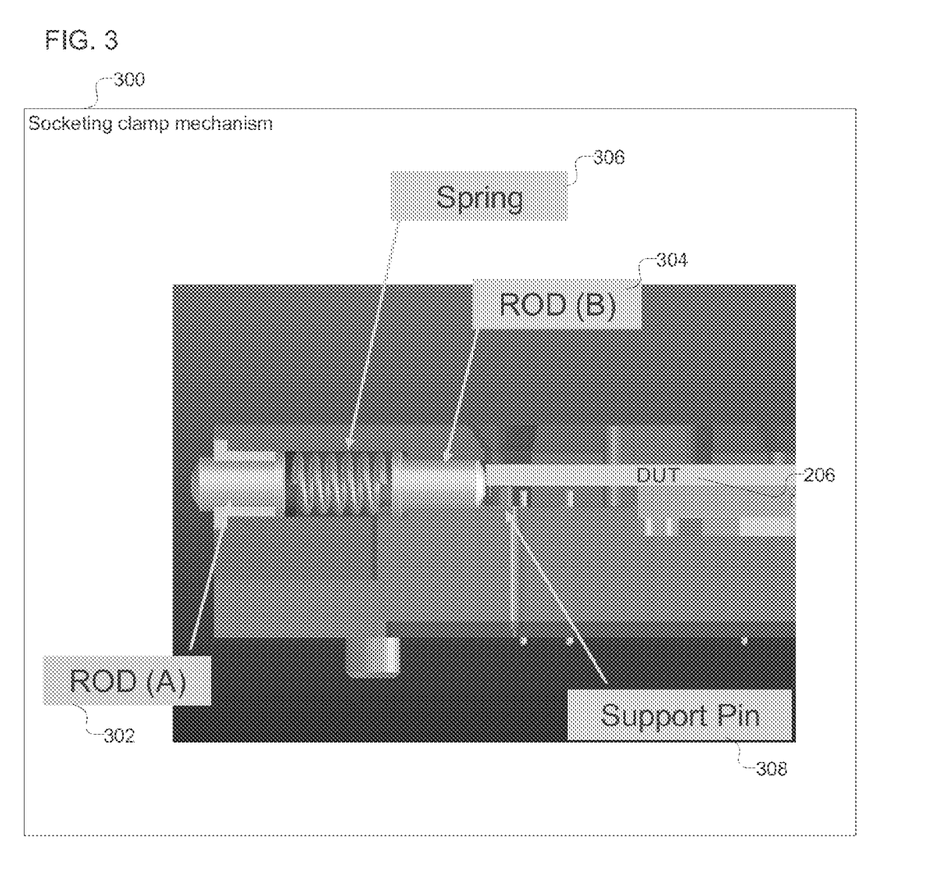
FIG. 3 illustrates a block diagram of a socketing clamp mechanism, in accordance with certain embodiments.

FIG. 3 illustrates a block diagram 300 of a socketing clamp mechanism 300, in accordance with certain embodiments. The socketing clamp mechanism 300 shown in FIG. 3 may correspond to the socketing clamp mechanisms 202 or 204 shown in FIG. 2.

The exemplary socketing clamp mechanism 300 is comprised of two rods 302, 304 and a spring 306. The clamp 110 fastener relies on the cam 112 (shown in FIG. 1) to engage the two socket rods 302, 304 which in turn apply a lateral force on the DUT 206 and constrains the motion of the DUT 206 in the Y-direction. The clamp 110 (shown in FIG. 1) also exerts a force on the DUT 206 in the vertical Z-direction enabling contact between the electrical socket pins and the pads of the DUT 206. FIG. 3 also shows support pins 308 that are used to support the DUT 310.

The transformation of one motion into any other motions is often conveniently accomplished by means of a cam mechanism A cam mechanism may be comprised of two moving elements, the cam and the follower. A cam may include a machine element having a curved outline or a curved groove, which, by its motion, gives a predetermined specified motion to another element called the follower. In the exemplary embodiment provided in FIG. 3, the two rods 302, 304 and the spring 306 comprise the follower to the cam 112. Motion of the cam 112 causes the rod/spring mechanism 302, 304, 306 to engage the DUT 206 and align the DUT along the Y axis.

In certain embodiments, the CAM mechanism has the two rods 302, 304 built in the socket body. As the clamp 110 comes down and interlocks with the socket body, the cam 112 may push the two rods 302, 304 along the Y-axis. It should be noted that when the DUT 206 is lowered into the socket cavity 104, the tolerances are initially quite loose such that the DUT can easily fit into the socket cavity 104 without any jamming. The cam 112 and the rods 302, 304 are used to provide a controllable lateral force from the side to align along the DUT along the Y-axis.

While FIG. 3 shows the rod/spring 302, 304, 306 mechanism to constrain movement of the DUT along the Y-axis, in additional embodiments, new or alternate rod/spring mechanisms or other mechanisms may be implemented constrain the movement of the DUT 206 along the X-axis.

Figure 4:
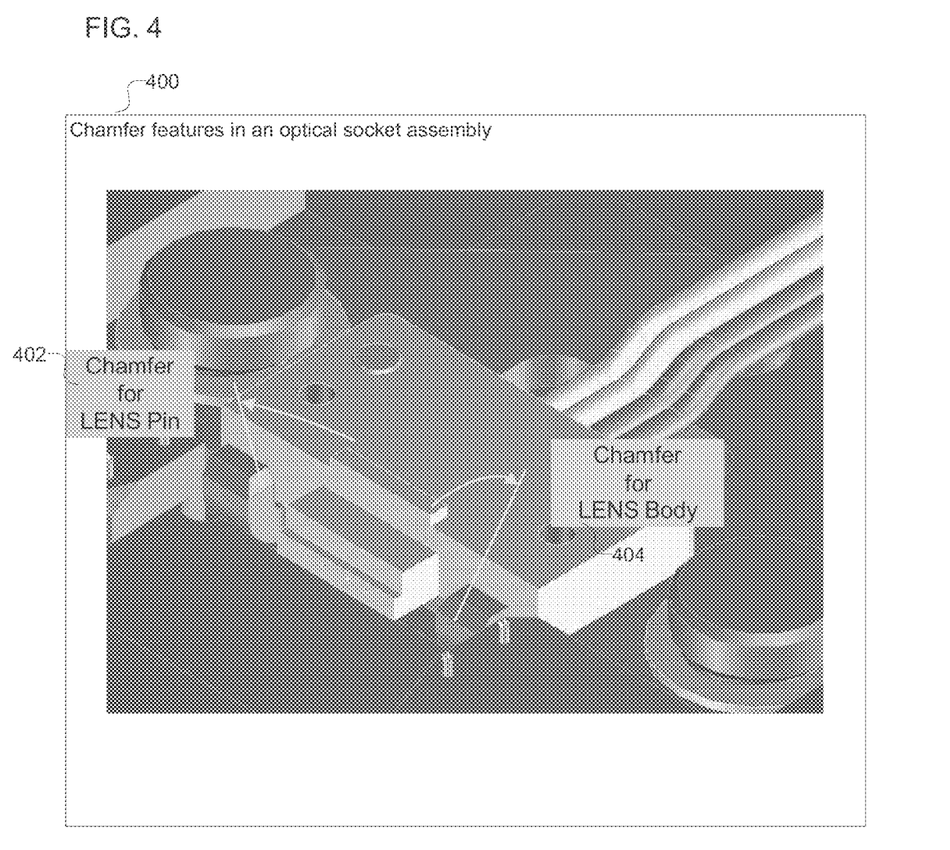
FIG. 4 illustrates a block diagram that shows chamfer features in an optical socket assembly, in accordance with certain embodiments.

FIG. 4 illustrates a block diagram 400 that shows chamfer features in an optical socket assembly, in accordance with certain embodiments. A chamfer is a beveled edge connecting two surfaces. FIG. 4 shows an exemplary chamfer 402 for a lens pin and an exemplary chamfer 404 for a lens body. The optical jumper has a 30 degree design chamfer feature around alignment dowel holes, to enable coarse alignment as the actuation by the DC motor 114 completes the socketing process. The chamfers on the socket body may guide the DUT 206 into the socket in X and Y directions (lateral directions). The chamfer tapered design allows the DUT 206 to be placed suitably in the socket cavity 104 based on the DUT package footprint. As a result, the DUT 206 is constrained correctly in a three dimensional framework along the X, Y, and Z axis.

Figure 5:
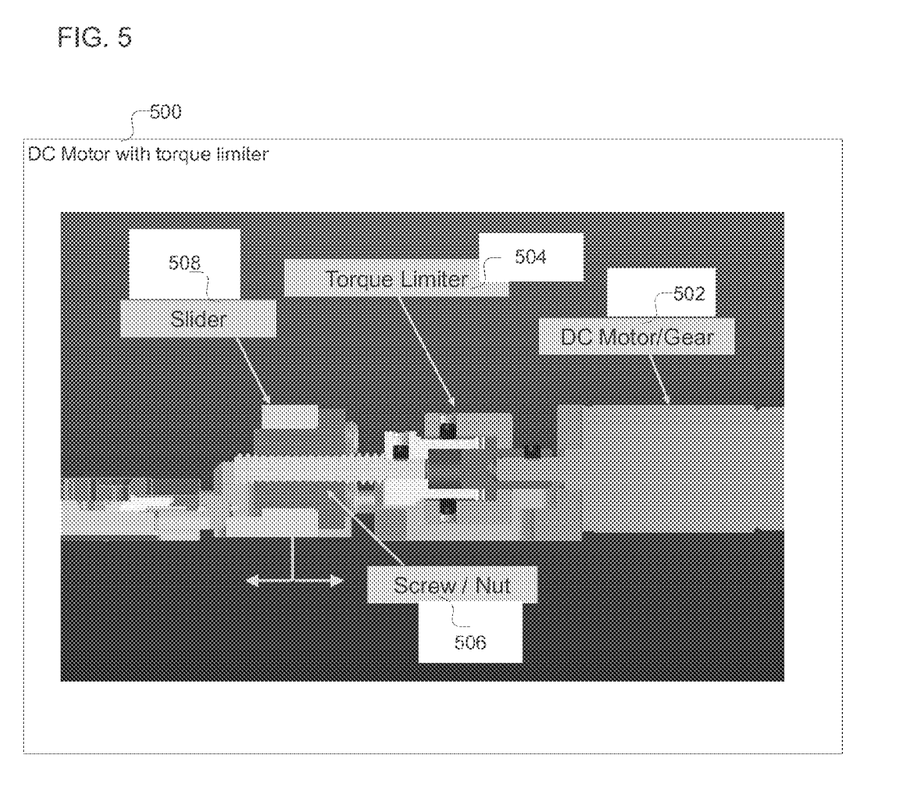
FIG. 5 illustrates a block diagram of a direct current (DC) motor with a torque limiter, in accordance with certain embodiments.

FIG. 5 illustrates a block diagram 500 of a DC motor 502 with a torque limiter 504, in accordance with certain embodiments. The DC motor 502 shown in FIG. 5 corresponds to the DC motor 114 shown in FIG. 1. A slider 508 and screws/nets 506 are also shown in FIG. 5.

The DC motor 502 is included to provide actuation in order to engage and align the side lens jumper assembly 108 laterally with a lens assembly of the DUT. The DC motor 502 is associated with a torque-limiter 504 that may be set to 30 gram force or other force to minimize the potential for damage to the DUT. The torque-limiter 504 restricts the force that can be applied to the DUT 206.

In certain embodiments, once the clamp 110 and the cam mechanisms have aligned the DUT 206, the DC motor 502 with the torque limiter 504 is engaged to complete the socketing of the DUT 206 to the socket 102. In certain embodiments the DC motor based actuation may be replaced via pneumatic actuation or some other mechanism.

The torque limiter 504 controls the forces to avoid damage to DUT 206. A variable and controllable force to avoid damage to the DUT may be achieved via other mechanisms, such as a spring mechanism.

Figure 6:
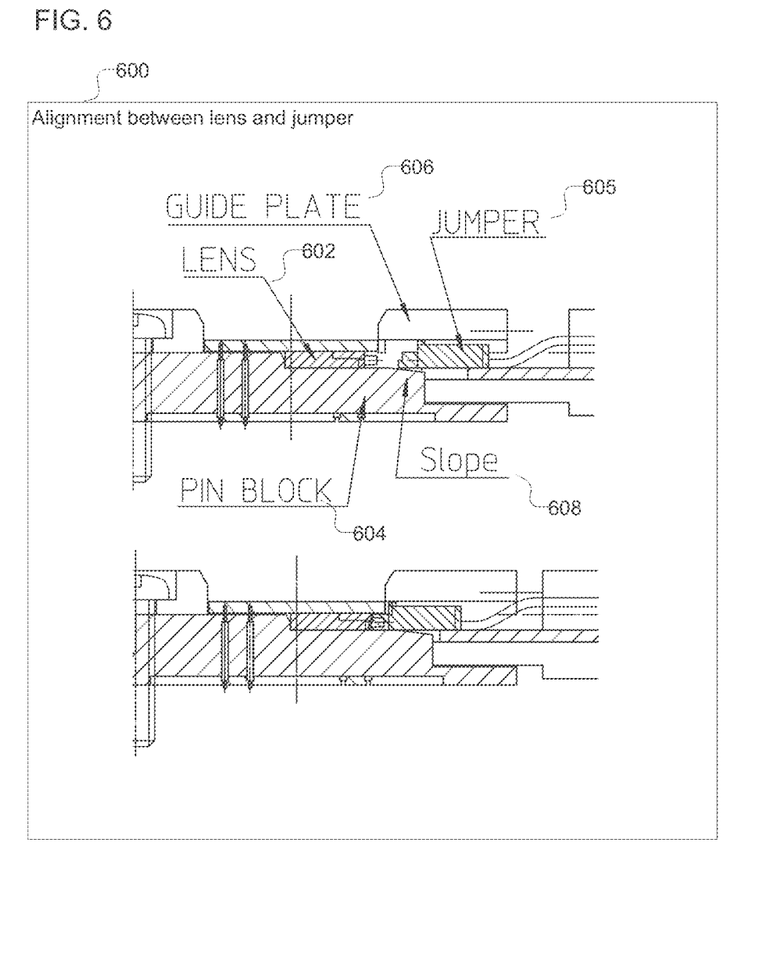
FIG. 6 illustrates a block diagram that shows alignment between a lens and an optical jumper, in accordance with certain embodiments.

FIG. 6 illustrates a block diagram 600 that shows alignment between a lens 602 and an optical jumper 605, in accordance with certain embodiments. The alignment between the lens 602 and the optical jumper 605 in the Y-direction is guided by a pin block 604 and a floating guide plate 606. An exemplary slope is also shown in FIG. 6.

In certain embodiments, the socketing clamping mechanism with a cam 112 is included to engage two rods which apply a lateral force on the DUT 206 in the Y-direction. Fine alignment features built onto socket components based on mechanical design and machining enable a clean passive alignment mechanism to exemplary tolerances of tens of microns.

Figure 8:
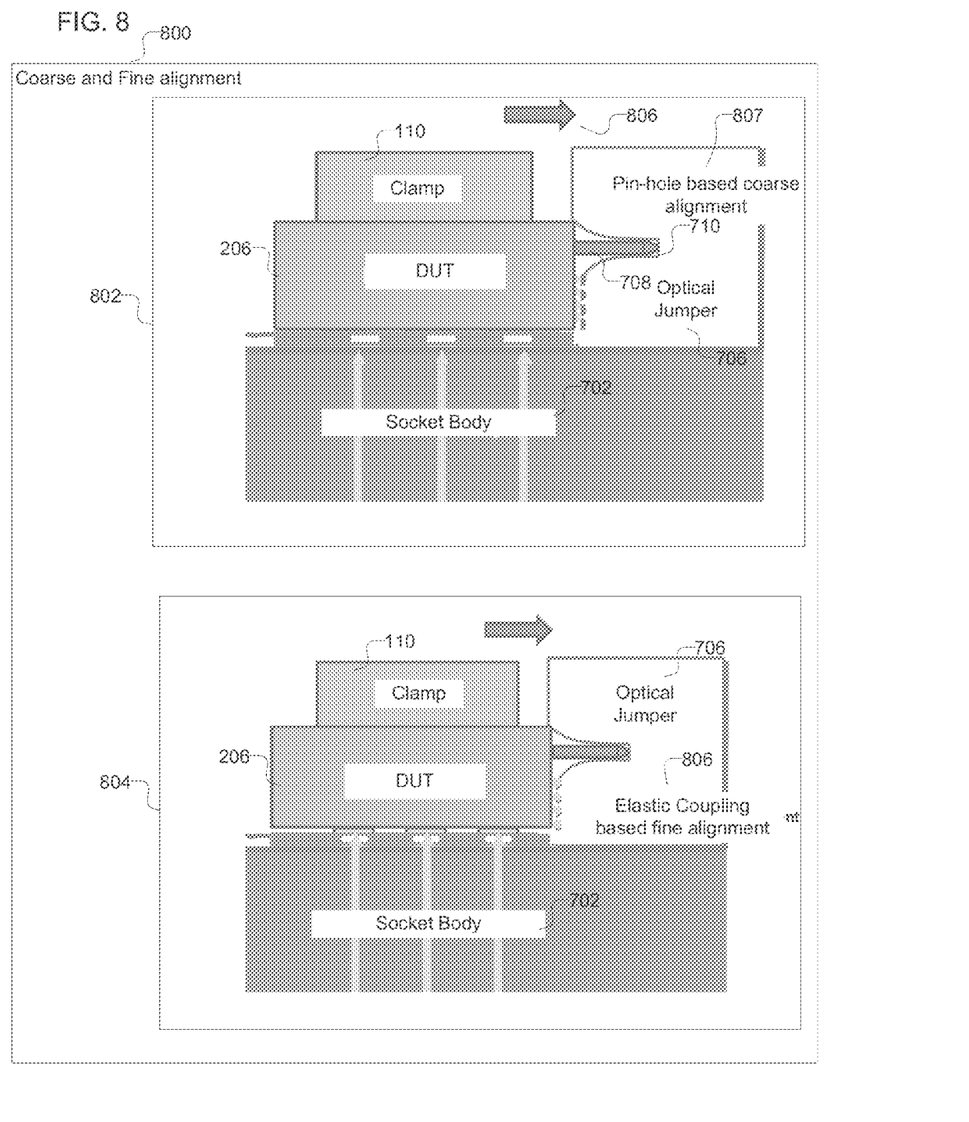
FIG. 8 illustrates a block diagram that shows coarse and fine alignment, in accordance with certain embodiments.
Figure 9:
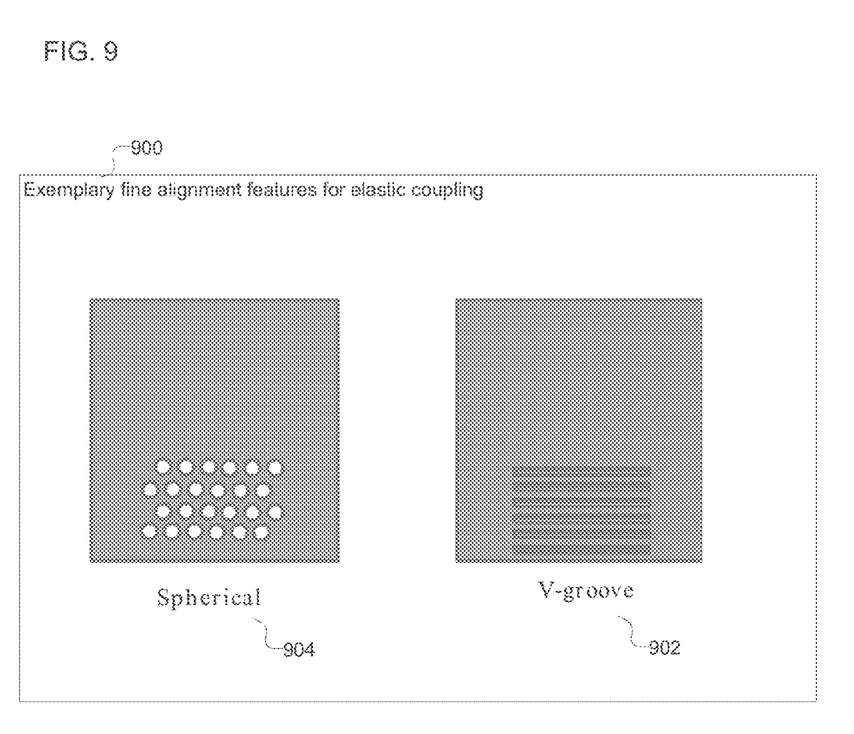
FIG. 9 illustrates a block diagram that shows exemplary alignment features for elastic coupling, in accordance with certain embodiments.

In certain additional embodiments, elastic coupling alignment for fine alignment of laser optics fibers may even provide improvements to a few micron-level alignment accuracy without introducing too much contact stress between components. Such embodiments that show elastic coupling based alignment are shown in FIGS. 7-9.

Figure 7:
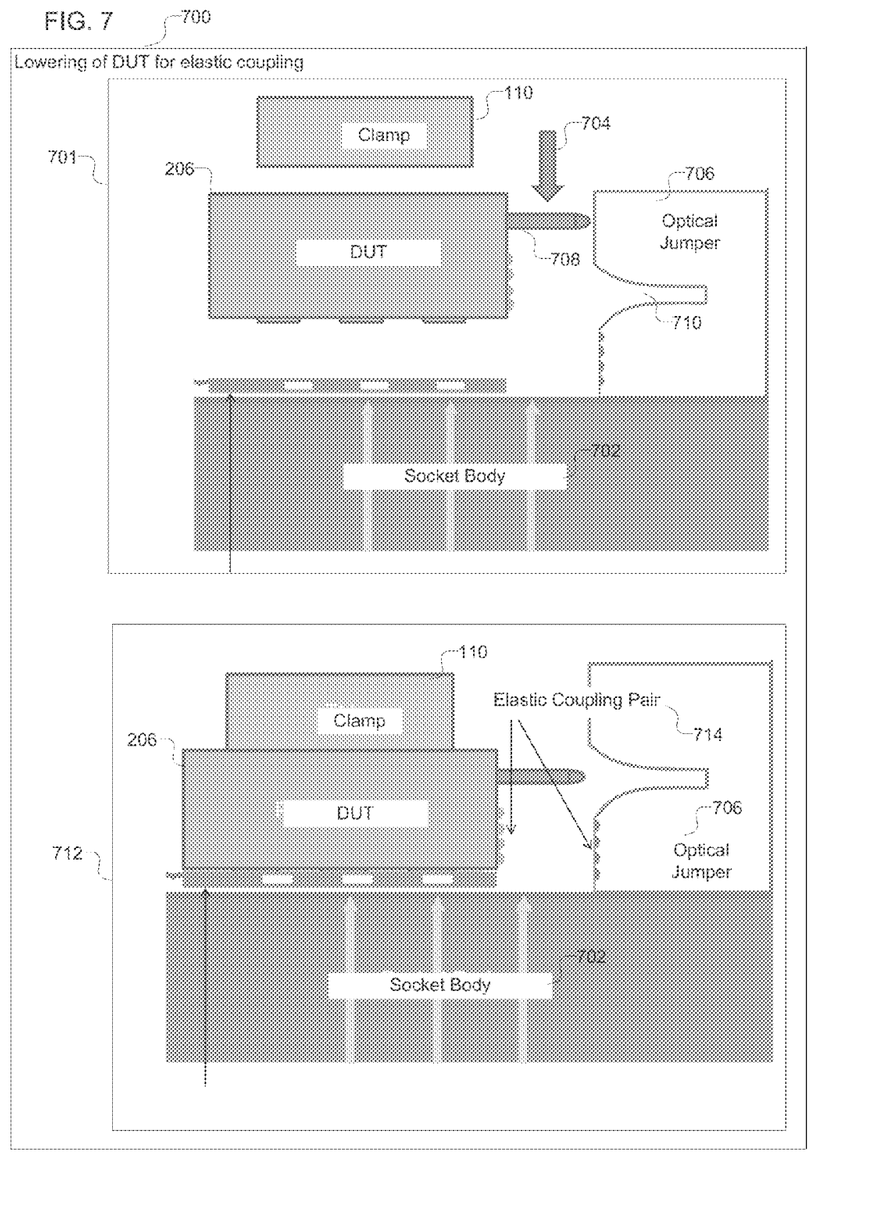
FIG. 7 illustrates a block diagram that shows the lowering of a DUT into a socket for elastic coupling, in accordance with certain embodiments.

FIG. 7 illustrates a block diagram 700 that shows the lowering of the DUT 206 via the clamp 110 onto the socket body 702 for elastic coupling, in accordance with certain embodiments.

Block 701 shows that the clamp 110 applies a vertical force (shown via reference numeral 704) on the DUT 206, to lower the DUT 206 for alignment along the vertical axis with the socket body 702. The optical jumper 706 is part of the socket assembly 100 and may be comprised of injection molded plastic with embedded optical elements. The pin 708 which is coupled to the DUT 206 aligns to a hole 710 on the optical jumper 706 in the same level along the vertical axis, when the clamp 110 aligns the DUT 206 along the vertical axis on the socket body 702 as shown in block 712.

The DUT 206 and the optical jumper 706 have elements (shown via reference numeral 714) to allow elastic coupling. The elements are referred to as elastic coupling pairs 714. Elastic coupling allows fine alignment of laser optics fibers between a package and a connector. In certain embodiments, elastic coupling alignment mechanisms may achieve a few micron-level alignment accuracy without introducing too much contact stress.

FIG. 8 illustrates a block diagram 800 that shows coarse and fine alignment, in accordance with certain embodiments. Coarse alignment is shown in block 802 and fine alignment is shown in block 804.

Initially (as shown in block 802), the DUT 206 is placed in the socket body 702. Then, the cam 112 and the DC motor 114 apply lateral forces 806 on the DUT 206 to cause the optical jumper 706 to laterally engage with the pin 708 on the DUT 206, via the hole 710 on the optical jumper 706. This accomplishes a coarse alignment 807 between the DUT 206 and the socket 102.

Subsequently, as shown in block 804, over-constrained elastic coupling features engage to complete the fine-alignment process (as shown via reference numeral 806).

FIG. 9 illustrates a block diagram 900 that shows exemplary alignment features for elastic coupling, in accordance with certain embodiments. Various patterns may be selected to provide elastic coupling with targeted alignment accuracy that is less than a few microns (e.g., less than two microns). Over constraint based elastic features can be implemented in certain embodiments via a variety of patterns such as prisms/v-grooves 903 or hemispherical protrusions 904.

Figure 10:
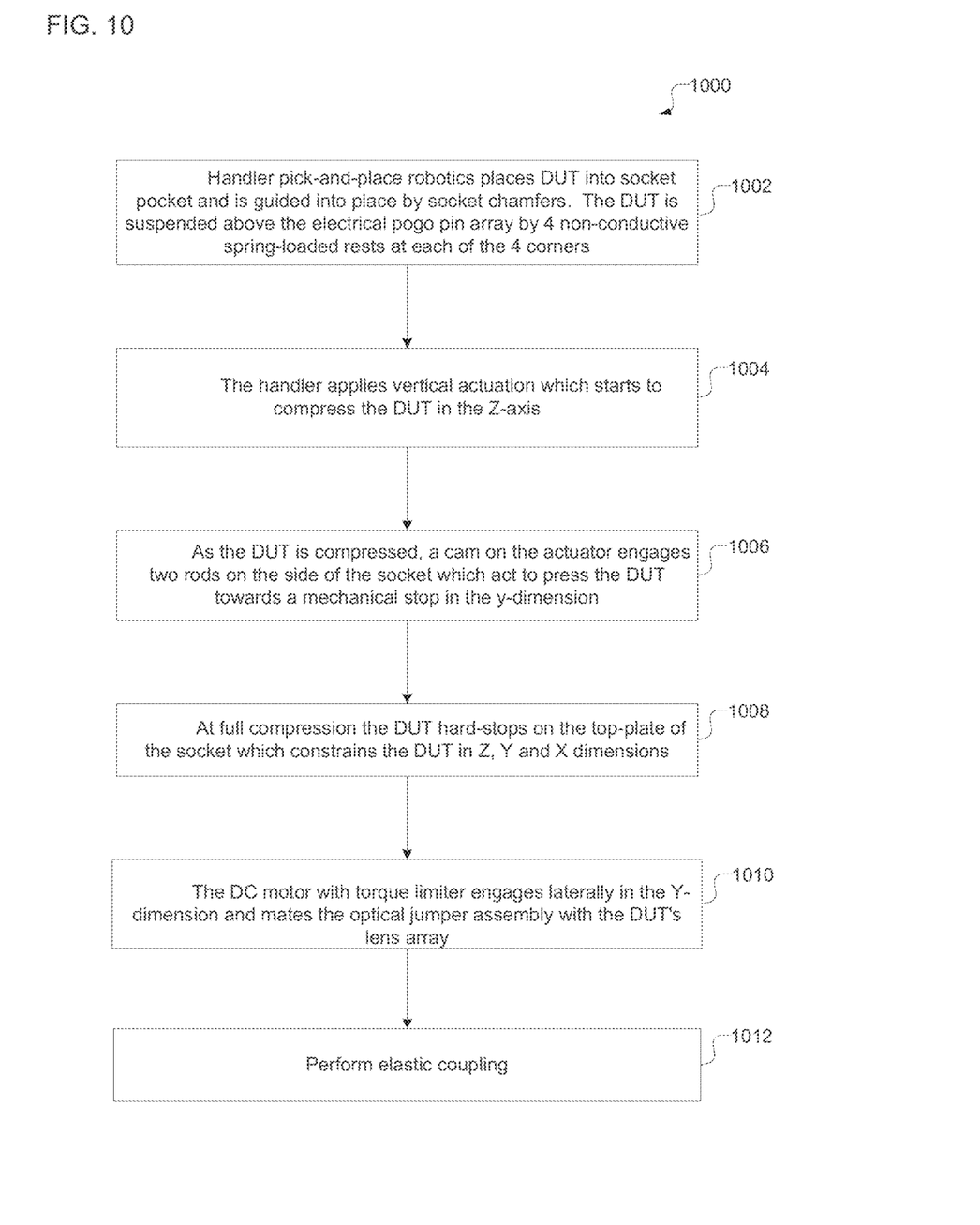
FIG. 10 illustrates a flowchart that shows exemplary operations, in accordance with certain embodiments.

FIG. 10 illustrates a flowchart 1000 that shows exemplary operations, in accordance with certain embodiments. Control starts at block 1002 in which a handler pick-and-place robotics places a DUT into a socket pocket (e.g., socket cavity 104) and is guided into place by socket chamfers. The DUT is suspended above an electrical pogo pin array by four non-conductive spring-loaded rests at each of the four corners.

Control proceeds to block 1004 in which the handler applies vertical actuation which starts to compress the DUT in the Z-axis. As the DUT is compressed, a cam on the actuator engages (at block 1006) two rods on the side of the socket which act to press the DUT towards a mechanical stop in the Y-dimension. At full compression the DUT hard-stops (at block 1008) on the top-plate of the socket which constrains the DUT in Z, Y and X dimensions.

Control proceeds to block 1010 in which the DC motor with torque limiter 500 engages laterally in the Y-dimension and mates the optical jumper assembly with the DUT's lens array. Subsequently elastic coupling is performed (at block 1012).

The process may be reversed to remove the DUT. During reversal of the process the DC motor is biased to disengage the optical jumper assembly with the DUT's lens array.

Therefore, FIGS. 1-10 show an optical lens jumper assembly that includes alignment dowels to enable passive alignment with a lens and fiber assembly on the socket side. In certain embodiments, at completion of the socketing process, tolerances are designed to be less than 125 microns in the Y-dimension, and less 10 microns in the X and Z-dimensions to maximize optical coupling efficiency. It may be accomplished by mechanically constraining the DUT in the socket, via custom chamfers in the optical assembly for course-alignment, and then via elastic coupling features in both the optical jumper and lens array components for enhanced alignment capability. The jumper alignment features may be made out of a durable material such as stainless steel or ceramic.

Therefore, FIGS. 1-10 illustrate certain embodiments in which mechanical loading of a DUT into a socket is performed and alignment is maintained for optical interfaces on the DUT and the socket. The DUT is inserted into the optical socket and the clamp in combination with other devices properly constrains the DUT along the X, Y, and Z axis. Subsequently elastic coupling is performed to align the DUT along the XZ plane.

FIGS. 1-10, illustrate certain embodiments in which a first device (e.g., the clamp 110) aligns a chip (e.g., the DUT 206) to a socket 102 along a first axis (e.g., the Z-axis). A second device (e.g., a cam mechanism 112, 202, 204) aligns the chip to the socket along a second axis (e.g., the Y-axis). A third device (e.g. elastic coupling pairs 714) aligns the chip to the socket along a plane (e.g., the XZ plane) formed by the first axis (e.g., the Z axis) and a third axis (e.g., the X-axis).

In certain embodiments, the first axis represents a vertical dimension that is perpendicular to a plane formed by the second axis and the third axis, wherein the socket is an optical socket, and where the chip is a device under test (DUT).

In certain embodiments, the first device applies vertical actuation that compresses the DUT along the vertical dimension onto the optical socket.

In certain embodiments, the second device comprises a cam mechanism that engages a cam to two rods to apply a lateral force on the DUT.

In certain additional embodiments, the third device comprises elastic coupling elements to perform alignment of the DUT to the socket to a tolerance of less than two microns. In certain embodiments, the alignment via the elastic coupling elements is based on patterns including at least one of hemispherical or v-groove protrusions. The third device may also include an optical jumper assembly having a hole to which a pin of the DUT is aligned.

In certain embodiments, a fourth device comprising a direct current (DC) motor is actuated to laterally engage an optical jumper assembly of the socket to a lens assembly of the DUT. The DC motor 114 includes a torque limiter that is set to allow no more than a threshold level of force to reduce potential for damage to the DUT.

In certain additional embodiments, two or more of the first device, the second device, and the third device are integrated into a single device.

Certain embodiments also implement a system comprising a first optical element, and a second optical element, where a first elastic element is coupled to the first optical element, and a second elastic element is coupled to the second optical element, and where the first elastic element is aligned to the second elastic element via elastic coupling. In certain embodiments, the first optical element is included in a socket, where the second optical element is included in a chip that is a device under test (DUT), and where the elastic coupling performs alignment of the DUT to the socket to a tolerance of less than two microns. In certain embodiments, the first and the second elastic elements may comprise the elastic coupling pair 714 shown in FIG. 7.

In certain additional embodiments, a first device aligns a chip to a socket along a first axis, where the first device applies vertical actuation to compress the chip along the vertical dimension onto the socket. A second device applies a lateral force to align the chip to the socket along a second axis. A third device comprising elastic coupling elements align the chip to the socket along a plane formed by the first axis and a third axis. In further embodiments, a fourth device comprising a DC motor is actuated to laterally engage an optical jumper assembly of the socket to a lens assembly of the chip.

The components shown or referred to in FIGS. 1-10 are described as performing specific types of operations. In alternative embodiments, the structures and components may be structured differently and have fewer, more or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A system, comprising:
   a first device to align a chip to an optical socket along a first axis;
   a second device to align the chip to the optical socket along a second axis; and
   a third device to align the chip to the optical socket along a plane formed by the first axis and a third axis, wherein the first axis represents a vertical dimension that is perpendicular to a plane formed by the second axis and the third axis, wherein the chip is a device under test (DUT), and wherein the third device comprises elastic coupling elements to perform alignment of the DUT to the optical socket to a tolerance of less than two microns.

2. The system of claim 1, wherein the first device applies vertical actuation that compresses the DUT along the vertical dimension onto the optical socket.

3. The system of claim 1, wherein the second device comprises a cam mechanism that engages a cam to two rods to apply a lateral force on the DUT.

4. The system of claim 1, wherein the alignment via the elastic coupling elements is based on patterns that include protrusions.

5. The system of claim 1, wherein the third device also includes an optical jumper assembly having a hole to which a pin of the DUT is aligned.

6. The system of claim 1, wherein two or more of the first device, the second device, and the third device are integrated into a single device.

7. A system, comprising:
   a first device to align a chip to an optical socket along a first axis;
   a second device to align the chip to the optical socket along a second axis;
   a third device to align the chip to the optical socket along a plane formed by the first axis and a third axis;
   a fourth device comprising a direct current (DC) motor that is actuated to laterally engage an optical jumper assembly of the optical socket to a lens assembly of the chip, wherein the first axis represents a vertical dimension that is perpendicular to a plane formed by the second axis and the third axis, and wherein the chip is a device under test (DUT).

8. The system of claim 7, wherein the DC motor includes a torque limiter that is set to allow no more than a threshold level of force to reduce potential for damage to the DUT.

9. A method, comprising:
   aligning, via a first device, a chip to an optical socket along a first axis;
   aligning, via a second device, the chip to the optical socket along a second axis; and
   aligning, via a third device, the chip to the optical socket along a plane formed by the first axis and a third axis, wherein the first axis represents a vertical dimension that is perpendicular to a plane formed by the second axis and the third axis, wherein the chip is a device under test (DUT), and wherein the third device comprises elastic coupling elements to perform alignment of the DUT to the socket to a tolerance of less than two microns.

10. The method of claim 9, wherein the first device applies vertical actuation that compresses the DUT along the vertical dimension onto the optical socket.

11. The method of claim 9, wherein the second device comprises a cam mechanism that engages a cam to two rods to apply a lateral force on the DUT.

12. The method of claim 9, wherein the alignment via the elastic coupling elements is based on patterns that include protrusions.

13. The method of claim 9, wherein the third device also includes an optical jumper assembly having a hole to which a pin of the DUT is aligned.

14. The method of claim 9, wherein two or more of the first device, the second device, and the third device are integrated into a single device.

15. A method, comprising:
   aligning, via a first device, a chip to an optical socket along a first axis;
   aligning, via a second device, the chip to the optical socket along a second axis;
   aligning, via a third device, the chip to the optical socket along a plane formed by the first axis and a third axis, wherein the first axis represents a vertical dimension that is perpendicular to a plane formed by the second axis and the third axis, and wherein the chip is a device under test (DUT); and
   laterally engaging an optical jumper assembly of the socket to a lens assembly of the DUT, via actuation of a fourth device comprising a direct current (DC) motor.

16. The method of claim 15, wherein the DC motor includes a torque limiter that is set to allow no more than a threshold level of force to reduce potential for damage to the DUT.

17. A system, comprising:
   a first device to align a chip to a socket along a first axis, wherein the first device applies vertical actuation to compress the chip along a vertical dimension onto the socket;
   a second device that applies a lateral force to align the chip to the socket along a second axis;
   a third device comprising elastic coupling elements to align the chip to the socket along a plane formed by the first axis and a third axis; and
   a fourth device comprising a direct current (DC) motor that is actuated to laterally engage an optical jumper assembly of the socket to a lens assembly of the chip.

* * * * *